United States Patent [19]
Shiraki et al.

[11] Patent Number: 5,368,327
[45] Date of Patent: Nov. 29, 1994

[54] AIR BAG DEVICE

[75] Inventors: Kouji Shiraki, Gifu; Masanari Sakamoto, Nagoya, both of Japan

[73] Assignee: Toyoda Gosei, Co., Ltd., Nishikasugai, Japan

[21] Appl. No.: 37,675

[22] Filed: Mar. 25, 1993

Related U.S. Application Data

[63] Continuation of Ser. No. 844,888, Mar. 3, 1992, abandoned, which is a continuation of Ser. No. 550,996, Jul. 11, 1990, abandoned.

[30] Foreign Application Priority Data

Jul. 12, 1989 [JP] Japan .................. 1-081913[U]
Oct. 11, 1989 [JP] Japan .................. 1-118881[U]

[51] Int. Cl.⁵ ............................................. B60R 21/16
[52] U.S. Cl. ........................... 280/728 A; 280/731; 280/743 R; 403/406.1; 403/408.1
[58] Field of Search ........... 280/726 R, 728 A, 731, 280/732, 736, 741, 743; 403/406.1, 408.1

[56] References Cited

U.S. PATENT DOCUMENTS

| | | | |
|---|---|---|---|
| 2,041,335 | 5/1936 | Hall | 403/408.1 |
| 3,456,969 | 7/1969 | Wittenmayer | 403/406.1 |
| 3,661,406 | 5/1972 | Mele | 403/408.1 |
| 3,962,843 | 6/1976 | King, Jr. | 403/408.1 |
| 4,025,216 | 5/1977 | Hives | 403/407.1 |
| 4,029,426 | 6/1977 | Sims, Jr. | 403/408.1 |
| 4,148,503 | 4/1979 | Shiratori et al. | 280/731 |
| 4,183,550 | 1/1980 | Sudou | 280/743 |
| 4,325,568 | 4/1982 | Clark et al. | 280/731 |
| 4,334,699 | 6/1982 | Patzelt et al. | 280/731 |
| 4,659,246 | 4/1987 | Sugiyama | 403/408.1 |
| 4,793,631 | 12/1988 | Takada | 280/743 |
| 4,815,907 | 3/1989 | Williamson et al. | 403/408.1 |
| 4,852,907 | 8/1989 | Shiraki et al. | 280/731 |
| 4,874,276 | 10/1989 | Iguchi | 403/408.1 |
| 4,988,119 | 1/1991 | Hartmeyer | 280/743 |
| 5,044,663 | 9/1991 | Seizert | 280/743 |
| 5,064,218 | 11/1991 | Hartmeyer | 280/743 |

FOREIGN PATENT DOCUMENTS

| | | | |
|---|---|---|---|
| 364267 | 4/1990 | European Pat. Off. | 280/728 |
| 3707370 | 9/1988 | Germany | 280/743 |
| 63-199149 | 8/1988 | Japan . | |

*Primary Examiner*—Eric D. Culbreth
*Attorney, Agent, or Firm*—Cushman, Darby & Cushman

[57] ABSTRACT

An air bag device having the need of only four securing bolts, one at each corner of the retaining and mounting plates, since in between corners there are two protrusions extending from one of those plates into holding holes in the other.

19 Claims, 7 Drawing Sheets

AIR BAG DEVICE

This is a continuation of application Ser. No. 07/844,888, filed on Mar. 3, 1992, which was abandoned upon the filing hereof; which was a continuation of Ser. No. 07/550,996filed Jul. 11, 1990, now abandoned.

FIELD OF THE INVENTION

This invention relates to an air bag device for installation in an automobile.

BACKGROUND OF THE INVENTION

Air bags of the general type of this invention may be seen in U.S. Pat. Nos. 4,148,503, 4,183,550, 4,334,699, and 4,852,907 and Japanese laid open patent application No. 63-199149 dated Aug. 17, 1988.

As shown in FIG. 12, a conventional air bag device MO comprises a air bag 1, an inflater 2, a mounting plate 4, a retaining plate 5 and a pad 7.

An annular flange portion 3 is formed around the inflater 2 that supplies gas into the air bag 1 in case of an accident. The mounting plate 4 is disposed on the annular flange portion 3. The annular retaining plate 5 is disposed on the mounting plate 4. An underside 1a of the air bag 1 is disposed between the mounting plate 4 and the annular retaining plate 5. The annular retaining plate 5 is firmly fixed to the underside of the air bag 1 by a bolt 5a. The bolt 5a protrudes to the underside of the flange portion 3 from the upper surface of the mounting plate 4. A nut 6 is screwed to the bolt 5a. Thus, the inflater 2, the retaining plate 5 and the air bag 1 are mounted to the mounting plate 4. The pad 7 covers the air bag 1 and is also held by the mounting plate 4.

When the air bag 1 is expanded suddenly by gas that is supplied from the inflater 2, the air bag 1 is under much stress, tending to pull the underside 1a out from between the retainers 4 and 5. Therefore, the underside 1a of the air bag 1 is held by eight to twelve bolts 5a or rivets, causing a large number of manufacturing steps to be needed.

An object of the present invention is to provide an air bag device which significantly reduces the number of manufacturing steps.

SUMMARY OF THE INVENTION

According to the present invention, there is provided an air bag device including an inflater having at its periphery a flange portion with bolt holes, a mounting plate having an opening with a periphery surrounding the inflater and bolt holes aligned with the bolt holes of the flange portion. The mounting plate also has holding holes. An arched pad with a thin-walled houses an air bag which has an opening for receiving the inflater and also has bolt holes and holding holes which are aligned with the bolt holes and holding holes of the mounting plate. There is also a retaining plate having an opening with a periphery surrounding the inflater. The retaining plate has fasteners secured to it for securing the air bag to said mounting plate and inflater via said bolt holes. One of those plates has protrusions and the other holding holes whereby the air bag is further secured by the protrusions being inserted through the holding holes of the other plate via the holding holes of the air bag.

DETAILED DESCRIPTION OF THE PRESENTLY PREFERRED EXEMPLARY EMBODIMENTS

Figure 1:
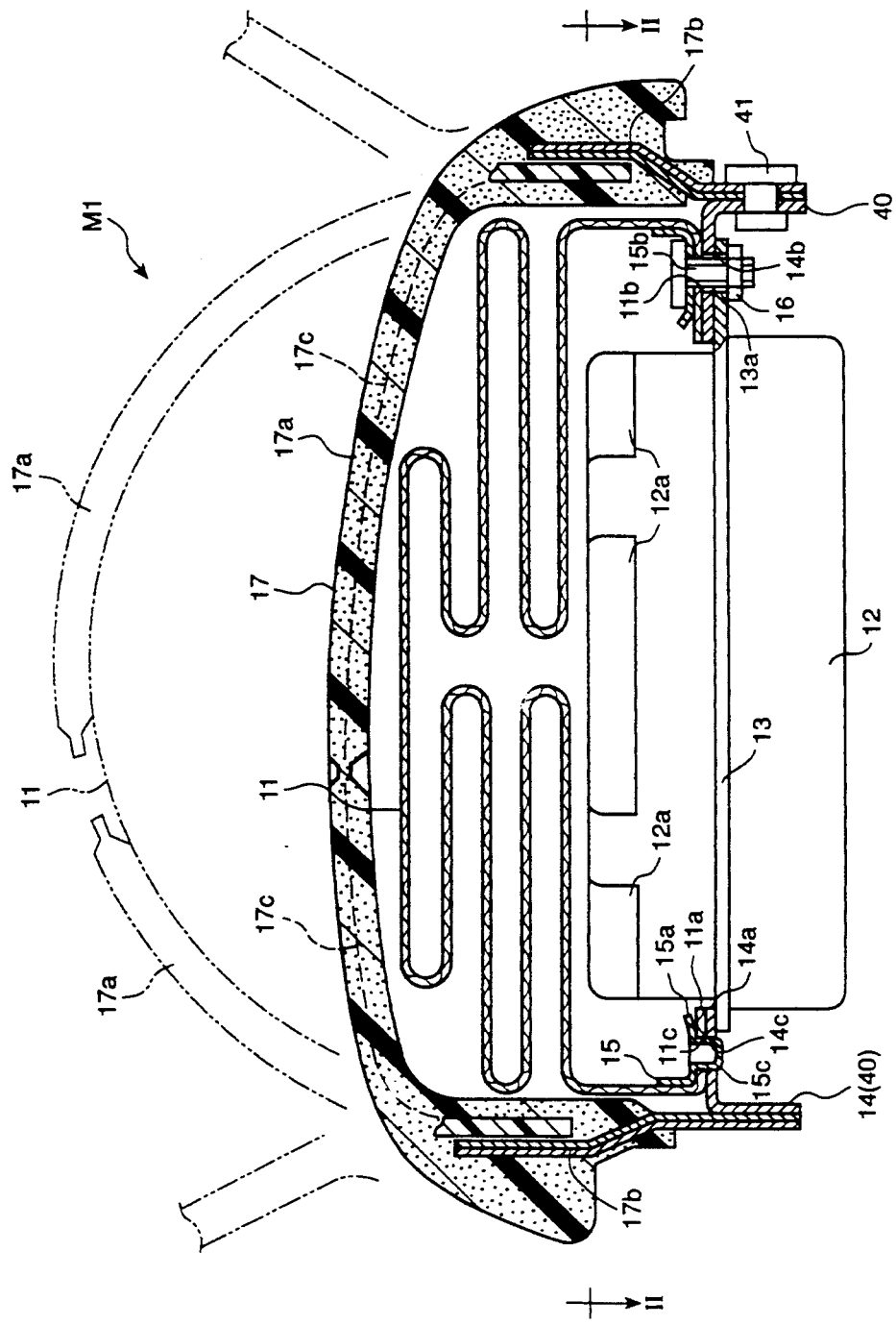
FIG. 1 is a cross-sectional view of an embodiment of an air bag device according to the present invention, which is taken along a line I—I in FIG. 2.
Figure 2:
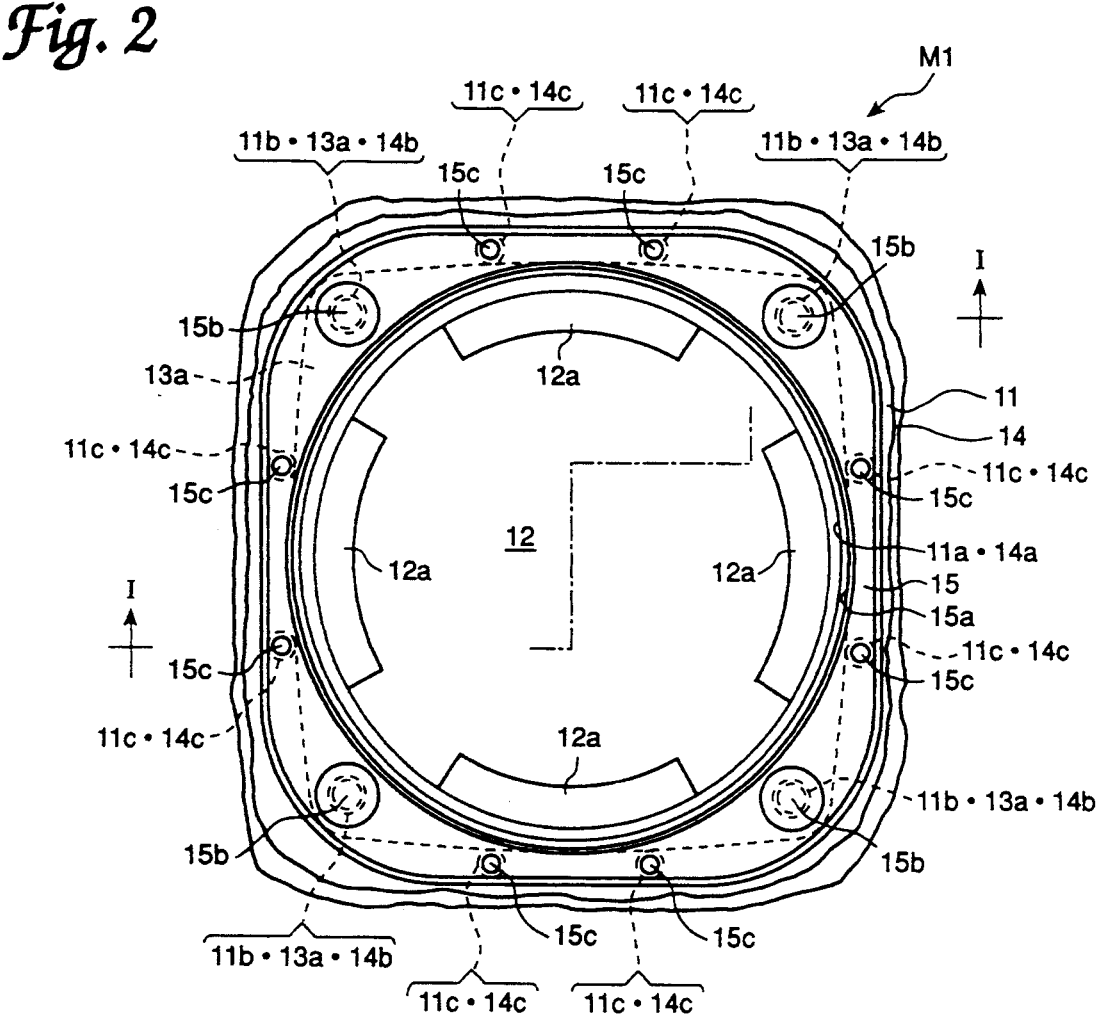
FIG. 2 is a plan-sectional view of an air bag device according to the present invention, which is taken along a line II—II in FIG. 1.

The air bag device of the present invention shown in FIGS. 1, 2 comprises an air bag 11, an inflater 12, a mounting plate 14, a retaining plate 15 and a pad 17.

The inflater 12 is shaped like a disk, and has a substantially square flange portion 13 extending around the outer periphery of the inflater 12. Each corner of the flange portion 13 has a bolt hole 13a. Holes 12a are formed in the upper surface of the inflater 12, and gush gas into the air bag 11 in case of an accident.

The mounting plate 14 is shaped like an inverted dish with a downwardly extending outer side wall 40 and an inner opening 14a for receiving the inflater 12. Around the periphery of opening 14a are bolt holes 14b which align with bolt holes 13a of the flange portion 13 of the inflater 12. Two holding holes 14c are spaced along each side between adjacent bolt holes 14b.

The side wall 40 is attached to the pad 17, which covers the air bag 11, by rivets 41 or bolts. The mounting plate 14 is fixed to the steering wheel by nuts and bolts (not shown).

The pad 17 consists of a coat layer 17a, an insert 17b and a net 17c. The coat layer 17a is made from synthetic resin, and is torn at a thin-walled portion when the air bag 11 inflates as shown in the phantom line inflation. The insert 17b is fixed to the side wall 40 of the mounting plate 14. Net 17c is disposed on the upper wall of the pad 17, and has flexibility.

The air bag 11 is normally folded and is kept in the pad 17, and inflates like the shape of a globe when the gas gushes into the air bag 11 from the holes 12a of the inflater 12. The air bag 11 is formed at its central part with a round opening 11a for insertion of inflater 12. Around the periphery of opening 11a are bolt holes 11b and holding holes 11c which are aligned with the bolt holes 14b and the holding holes 14c of the mounting plate 14.

The retaining plate 15 is annularly shaped with an upwardly turned outer edge and is made of sheet metal. The retaining plate 15 is formed at its central part with an opening 15a for receiving inflater 12.

Each corner of the retaining plate 15 is pre-welded to the heads of bolts 15b which protrude through the bolt holes 11b of the air bag 11.

Between the bolts 15b which are located on the periphery of the opening 15a are a spaced pair of protrusions 15c which are aligned with the holding holes 11c of the air bag 11. The protrusions 15c extend downward from a base portion of the retaining plate 15 by drawing or press forming and are inserted into the holding holes 14c of mounting plate 14 through the holding holes 11c of the air bag 11.

The air bag device M1 is assembled in the manner now described. The retaining plate 15 with its pre-welded bolts 15b is put into the air bag 11 from the opening 11a, and is located on the periphery of the opening 11a. The bolt holes 11b and the holding holes 11c of the air bag 11 are pushed onto the bolts 15b and the protrusions 15c, respectively, when the air bag 11 is folded. Then, the bolt holes 14b and the holding holes 14c of the mounting plate 14 are pushed onto the bolts 15b and the protrusions 15c when the mounting plate 14 is located under the periphery of the opening 11a.

Thereafter, the inflater 12 is inserted into the opening 14a of the mounting plate 14, the opening 11a of the air bag 11 and the opening 15a of the retaining plate 15. The bolts 15b extending from the retaining plate 15 are inserted into the bolt holes 13a of the flange portion 13, and the nuts 16 are screwed to the bolts 15b. The insert 17b of the pad 17 and the side wall 40 of the mounting plate 14 are clamped and fixed by rivets 41.

The air bag device M1 is then fixed to the steering wheel by nuts (not shown) setting on the mounting plate 14 or the like.

The air bag 11 is thrown out of the upper wall of pad 17 and inflates greatly over the pad 17 when the holes 12a of the inflater 12 gush gas into the air bag 11 in case of an accident. The protrusions 15c which are inserted into the holding holes 14c of the mounting plate 14 through the holding holes 11c of the air bag 11 mainly regulate the location of the edge of the air bag not only initially and when the bag is not inflated but also aid in maintaining the edge of the air bag in its proper location when the bag is inflated. That is, when the bag is inflated there is a stress horizontally and radially outward that tends to pull the air bag edge loose. However, the protrusions 15c help prevent that. Therefore, only four fastening bolts are necessary, a reduction by a third to one half necessary in the prior art.

FIGS. 3 to 11 illustrate other embodiments of essential portions of the air bag device according to the present invention.

Figure 3:
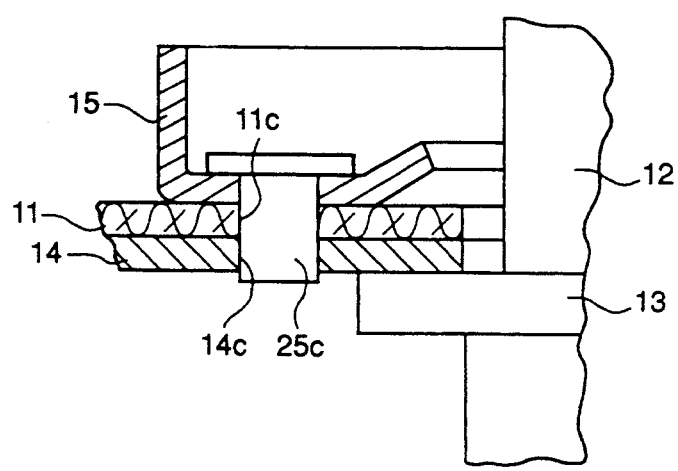
FIG. 3 is an enlarged partial cross-sectional view of essential portions of another embodiment.
Figure 4:
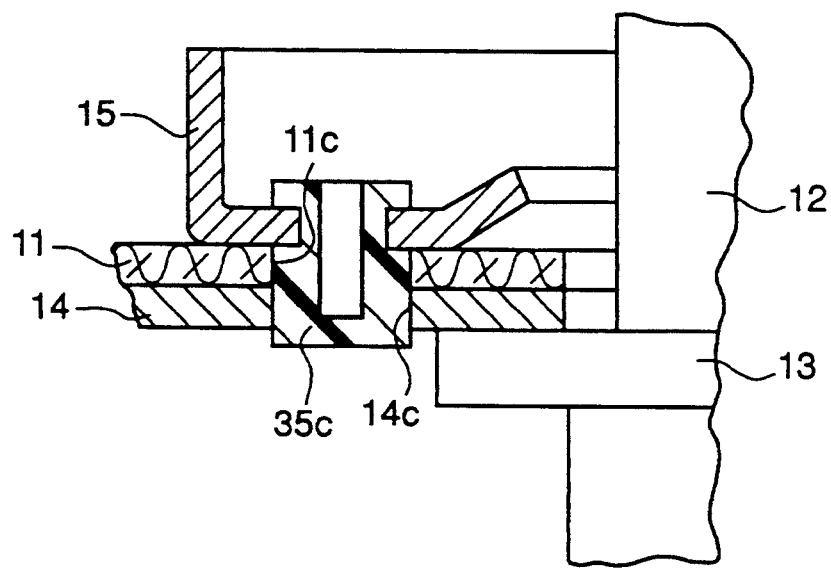
FIGS. 4, 5, 6, 7 and 8 are enlarged partial cross-sectional views of essential portions of still other embodiments.
Figure 5:
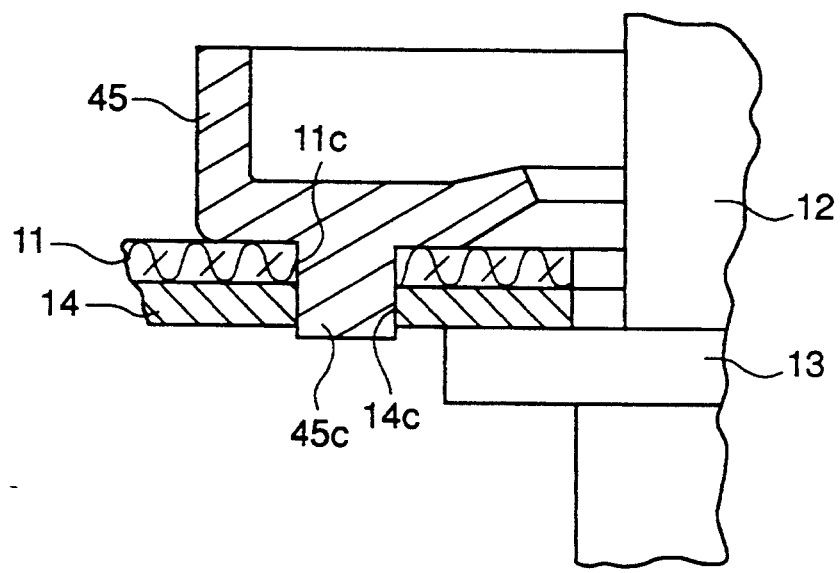

In FIG. 3, protrusions 25c are pre-welded to the retaining plate 15. As shown in FIG. 4, each protrusion 35c is made from a plastic material such as a synthetic resin, and is set (hooked, as shown) into a respective hole in retaining plate 15. In FIG. 5, a retaining plate 45 is a molded die casting with integral protrusions 45c and bolts (not shown) which fix the flange portion 13 of the inflater 12 and the retaining plate 45.

Figure 6:
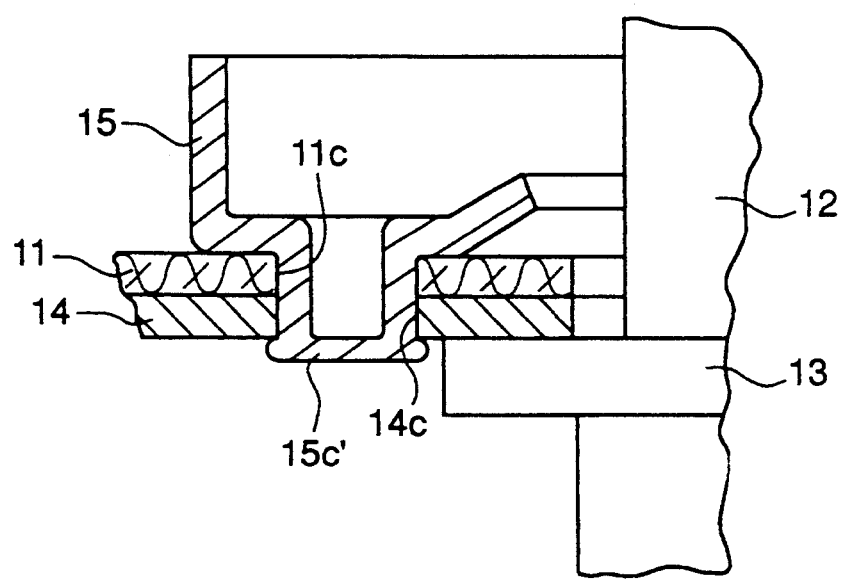

In FIG. 6, a tip of the integral protrusion 15c' is crimped a little after the retaining plate 15 is put in the air bag 11 and the mounting plate 14. Then, the air bag 11 is folded.

Figure 7:
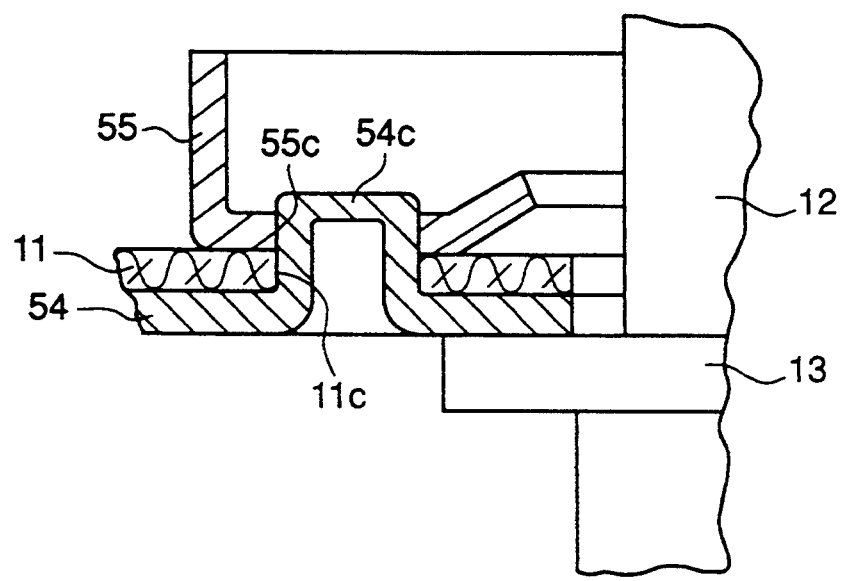

As shown in FIG. 7, integral protrusions 54c are formed from the mounting plate 54 and are inserted into holding holes 55c formed in retaining plate 55.

Figure 8:
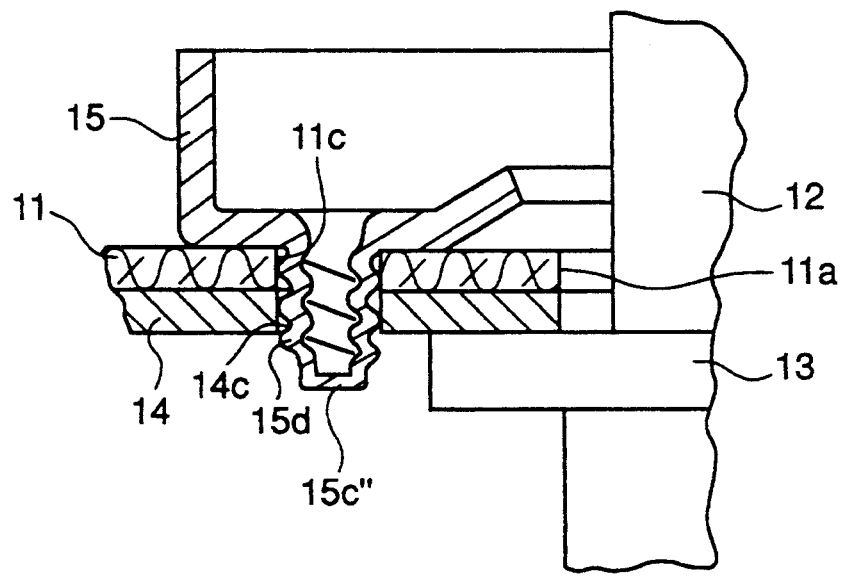
Figure 9:
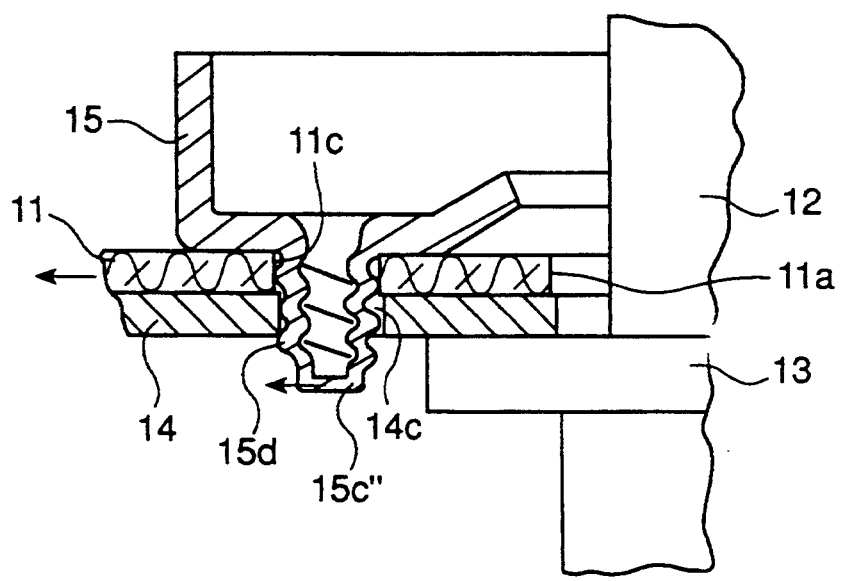
FIG. 9 is an enlarged partial cross-sectional view when the air bag shown in FIG. 8 inflates.
Figure 10:
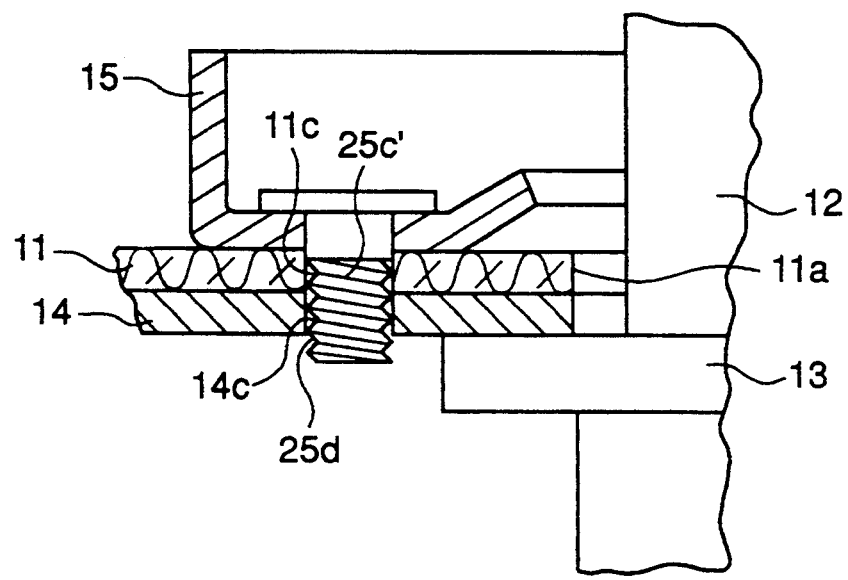
FIGS. 10 and 11 are enlarged partial cross-sectional views of essential portions of still other embodiments.

As shown in FIG. 8, an integral, hollow corrugated element 15d like a screw is formed in the outer surface of the protrusions 15c''. The air bag 11 is thrown out of upper wall of the pad 17 and inflates greatly over the pad 17 when the holes 12a of the inflater 12 gush gas into the air bag 11 in case of an accident. The periphery of the opening 11a of the air bag 11 is pulled by the tension toward a horizontal or radial direction outwardly, as shown in FIG. 9. In that case, the protrusions 15c'' are pulled a little in the same horizontal direction by the air bag 11, and element 15d is caught at the corner of the periphery of the holding holes 14c. Therefore the protrusions 15c'' of the retaining plate 15 are prevented from moving upward from the holding holes 14c of the mounting plate 14.

Figure 11:
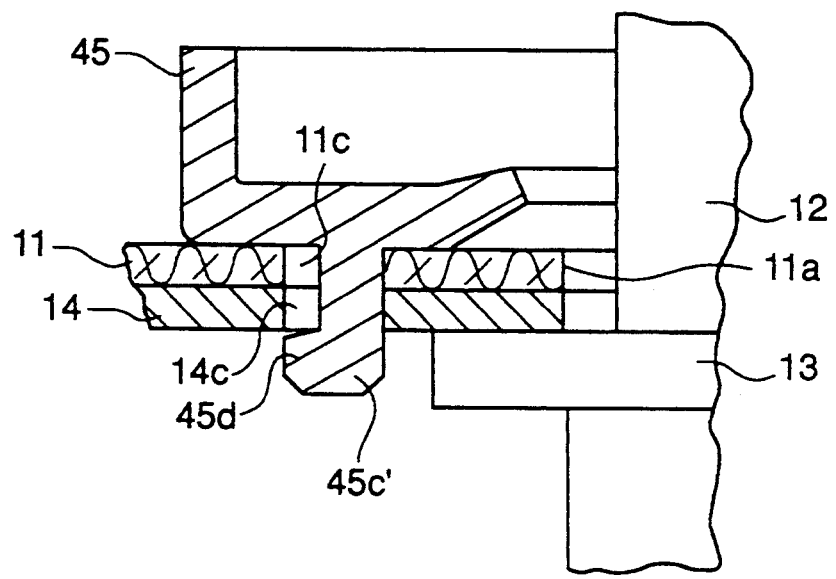
Figure 12:
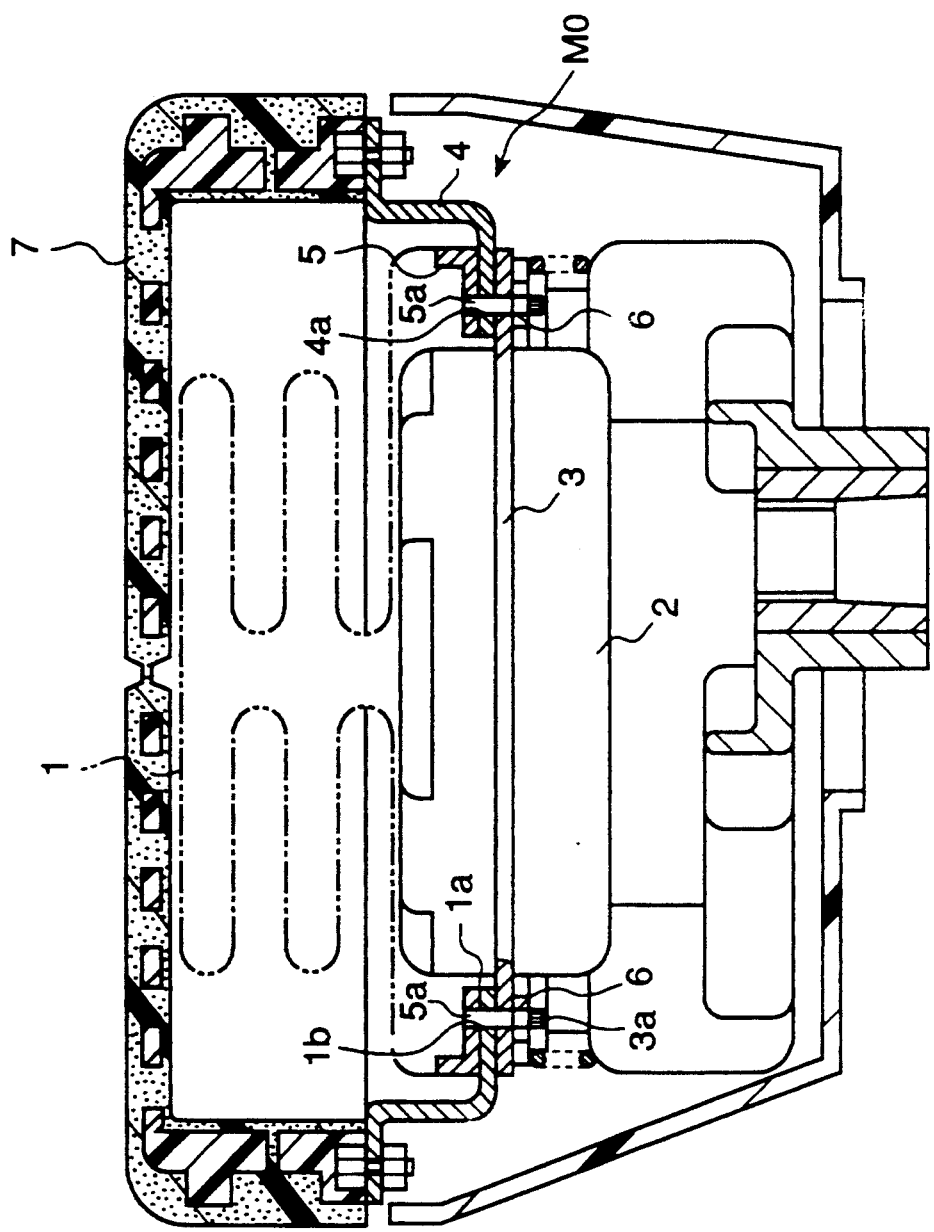
FIG. 12 is a cross-sectional view of an air bag device in the prior art.

It will be appreciated that further modifications may be made. For example, the corrugations can be in the outer surface of any of the various protrusions 15c, 25c, 35c, 45c or 55c as shown in exemplary FIG. 10 by threads 25d on welded protrusion 25c'. Furthermore, as shown in FIG. 11, a hook 45d is formed at the tip of the integral protrusion 45c' which is a molded die casting. In that case, the hook 45d is caught at the corner of the periphery of the holding holes 14c when the protrusion 45c' moves outwardly because the air bag 11 inflates.

Still further modifications will be realized by those skilled in the art and such are to be included within the scope of this invention which is defined by the following claims.

What is claimed is:

1. An air bag device comprising:
   an inflater member provided with a peripheral flange containing a plurality of spaced apart fastener holes;
   a mounting plate extending about said inflater and having a first set of holes aligned with said plurality of fastener holes in said flange;
   an air bag having an opening with a periphery surrounding said inflater with the periphery including a plurality of holes corresponding to each hole of the first set of holes;
   a retaining plate extending about said inflater, said retaining plate including a plurality of spaced apart fasteners secured thereto and respectively aligned with said first set of holes and extending through said flange, said mounting plate and said air bag periphery and being secured so as to hold the flange, mounting plate, air bag periphery and retaining plate together;
   said device further having a plurality of spaced apart protrusions secured to one of said mounting plate and said retaining plate and aligned with and protruding through a second set of holes provided in the other of said mounting plate and said retaining plate and through said air bag periphery so that the protrusions locate and only horizontally restrain said air bag periphery, said protrusions having a shaft surface extending respectively from a surface of said one of said mounting and said retaining plates to an opposite end of said protrusions, a largest diameter of said shaft surface being respectively smaller than said one of said first holding holes of said retaining and said mounting plates and said second holding holes of said air bag, and said shaft surface protruding through said one of said mounting and retaining plates substantially perpendicular to a surface of said one of said mounting and retaining plates.

2. An air bag device according to claim 1, wherein said retaining plate has eight of said spaced protrusions.

3. An air bag device according to claim 2, wherein there are four of said spaced fasteners comprising and said eight protrusions are disposed two each between each pair of adjacent fasteners.

4. An air bag device according to claim 1, wherein said protrusions are welded to said retaining plate.

5. An air bag device according to claim 1, wherein said retaining plate and protrusions are a molded die casting.

6. An air bag device according to claim 1 wherein said protrusions are integrally formed with said mounting plate.

7. An air bag device according to claim 1 wherein said protrusions are integrally formed with said retaining plate.

8. An air bag device as in claim 1 wherein said fasteners are bolts.

9. An air bag device comprising:

an inflater including at its periphery a flange portion containing a plurality of spaced first holes, a mounting plate having an opening with a periphery surrounding said inflater and having a plurality of spaced second holes aligned with said first holes, an arched pad having a thin-walled portion, an air bag inside said pad and having an opening with a periphery surrounding said inflater, said air bag having an edge containing a plurality of third holes and a plurality of first holding holes, a retaining plate having an opening with a periphery surrounding said inflater and having spaced fasteners secured to said retaining plate and respectively aligned with and extending through said first, second and third holes and securely holding said air bag, retaining plate, mounting plate and inflater flange portion together, one of said mounting and retaining plates having a plurality of spaced second holding holes disposed in and around the said periphery thereof, said air bag first holding holes being aligned with said second holding holes of said one of said mounting and retaining plates, the other of said mounting and retaining plates having a plurality of spaced protrusions aligned with and being respectively inserted into said second holding holes through said first holding holes respectively to initially locate the edge of the air bag and to provide only horizontal and radial restraint for the edge of said air bag upon inflation, said protrusions having a shaft surface, a largest diameter of said shaft being smaller than said first holding holes of said one of said retaining and said mounting plates and said second holding holes of said air bag, and said shaft surface extending respectively from a surface of said one of said mounting and said retaining plates to an opposite end of said protrusions and protruding respectively through said one of said mounting and retaining plates substantially perpendicular to a surface of said one of said mounting and retaining plates.

10. An air bag device as in claim 9, wherein said fasteners are bolts having heads welded to said retaining plate.

11. An air bag device as in claim 9, wherein said protrusions and said other of said mounting and retaining plates are integral.

12. An air bag device as in claim 9, wherein said second holding holes are in said mounting plate and the said protrusions extend from said retaining plate.

13. An air bag device as in claim 12, wherein said protrusions and retaining plate are integral.

14. An air bag device as in claim 13, wherein said integral retaining plate and protrusions are a molded die casting.

15. An air bag device as in claim 9, wherein said second holding holes are in said retaining plate and the said protrusions extend from said mounting plate.

16. An air bag device as in claim 15, wherein said protrusions and mounting plate are integral.

17. An air bag device as in claim 9, wherein said protrusions are individual plastic elements hooked in respective third holding holes of said other of said mounting and retaining plates.

18. An air bag device as in claim 9, wherein said protrusions have a hollow interior.

19. An air bag device as in claim 9, wherein said protrusions are separate items welded to said other of said mounting and retaining plates.

* * * * *